United States Patent [19]

Pozelt et al.

[11] 3,907,351

[45] Sept. 23, 1975

[54] IMPACT-DAMPING SYSTEM FOR AUTOMOTIVE VEHICLES

[75] Inventors: Martin Pozelt, Ingolstadt; Manfred Uebelstadt, Wettstetten; Ahlrich Dahn; Karl Bauer, both of Ingolstadt, all of Germany

[73] Assignee: Audi Nsu Auto Union Aktiengesellschaft, Ingolstadt, Germany

[22] Filed: Mar. 19, 1974

[21] Appl. No.: 452,561

[30] Foreign Application Priority Data
Mar. 21, 1973  Germany............................ 2313927

[52] U.S. Cl..................... 293/71 R; 293/86; 293/88
[51] Int. Cl.²......................................... B60R 19/06
[58] Field of Search ............ 293/1, 71 R, 85, 86, 88, 293/89, 99; 267/140, 35

[56] References Cited
UNITED STATES PATENTS

| | | | |
|---|---|---|---|
| 1,451,497 | 4/1923 | Dunston............................ | 293/99 X |
| 1,855,977 | 4/1932 | Llobet................................ | 293/85 |
| 2,600,060 | 6/1952 | Lopes et al. ........................ | 293/85 |
| 2,606,785 | 8/1952 | Fisher............................... | 293/85 X |
| 3,008,746 | 11/1961 | Senger.............................. | 293/86 X |
| 3,715,138 | 2/1973 | Finkle................................ | 293/1 |
| 3,751,091 | 8/1973 | Renneker........................... | 293/85 X |
| 3,795,418 | 3/1974 | Barenyi et al....................... | 293/88 |

*Primary Examiner*—M. Henson Wood, Jr.
*Assistant Examiner*—Andres Kashnikow
*Attorney, Agent, or Firm*—Karl F. Ross; Herbert Dubno

[57] ABSTRACT

A bumper bar of an automotive vehicle is mounted near its ends on two hydraulic shock absorbers which are partly received in a pair of tubular guide members rigid with the vehicular chassis, the ends of the shock absorbers remote from the bumper bar being pivotally secured inside these guide tubes whereby the unit consisting of the shock absorbers and the bumper bar can limitedly swing in a horizontal plane, such swinging is resisted by a stiff connection of limited deformability between the cylinder of each shock absorber and the bumper bar, this connection yielding to lateral stresses in the case of a collision. The cylinders are normally held centered within their guide tubes by yieldable slide bearings in the form of elastic collars with internal projections.

14 Claims, 6 Drawing Figures

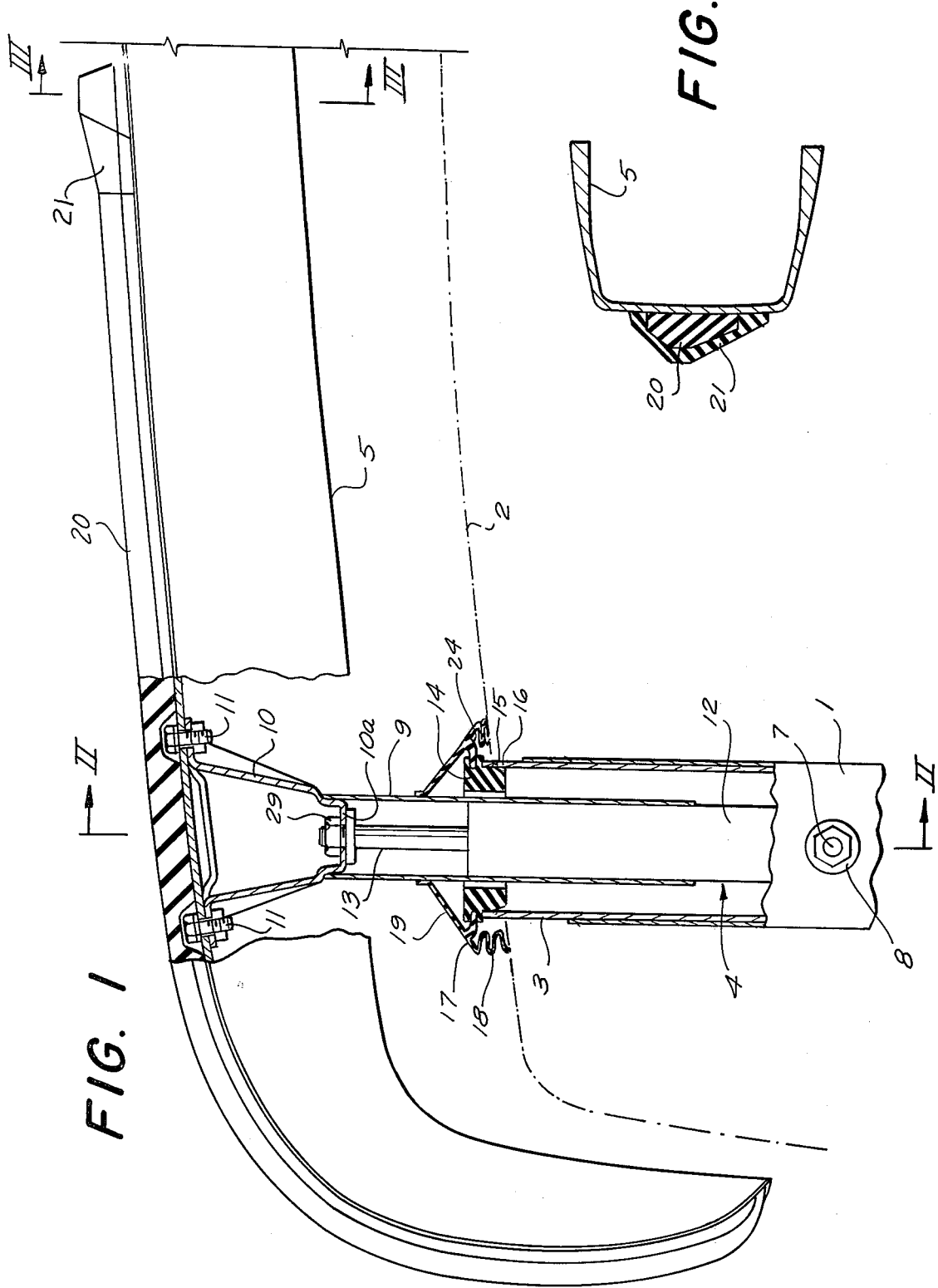

3,907,351

IMPACT-DAMPING SYSTEM FOR AUTOMOTIVE VEHICLES

FIELD OF THE INVENTION

Our present invention relates to an impact-damping system for automotive vehicles in which a horizontal bumper bar, at the front or rear end of the vehicle, is yieldably secured to the vehicular chassis with the aid of shock absorbers including, for example, hydraulic piston-and-cylinder assemblies of the dashpot type.

BACKGROUND OF THE INVENTION

Such impact-damping system provide a certain amount of protection in the case of head-on or rear-end collisions by absorbing energy which would otherwise damage fenders or other parts of the vehicle body. They have been found capable of cushioning the shocks resulting from such frontal or rear-end collisions, at relative speeds up to about 8 km or 5 miles per hour between the vehicle and the colliding object, without permanent deformation of any structural element. However, they are considerably less effective against lateral stresses resulting from impacts at an angle to the longitudinal axis of the vehicle, e.g. upon glancing contact between the bumper bar and a wall or other object located alongside the road.

OBJECTS OF THE INVENTION

The general object of our present invention is to provide an improved impact-damping system of the character set forth which will also protect the vehicle against such lateral stresses.

A more particular object is to provide a system of this nature which, after an accident giving rise to nonlongitudinal forces, retains its structural cohesiveness and does not fragmentize so as to cause annoying rattling upon further driving.

SUMMARY OF THE INVENTION

These objects are realized, in conformity with our present invention, by the provision of a pair of preferably tubular guide members rigid with the vehicular chassis, these guide members being pivotally connected to the ends of the shock absorbers remote from the bumper bar; normally, the shock absorbers are aligned with the guide members in a direction substantially parallel to the longitudinal axis of the vehicle. The shock absorbers, more particularly their cylinders in the case of hydraulic dashpot assemblies, are joined to the bumper bar through a stiff, limitedly deformable connection yielding to lateral stresses which cause a horizontal swing of the unit about the two pivotal axes. Thus, the bumper bars and the two shock absorbers effectively form with the chassis a parallellogrammatic linkage stiffened against lateral deflection by the rigidity of the deformable connection.

Advantageously, pursuant to a more specific feature of our invention, the dashpot assembly of each shock absorber is provided with a reinforcing sleeve which slidably embraces its cylinder and forms part of the stiff connection with the bumper bar, this connection also including an outwardly diverging campaniform base rigid with the bumper bar. The heads of bolts securing this base to the bumper bar may be overlain, on the exposed side of that bar, by a resilient guard strip of the type conventionally provided on such bumpers.

According to a further feature of our invention, the dashpot cylinder of each shock absorber is also normally held centered with reference to the associated guide tube by a laterally yieldable joint supplementing the centering effect of its reinforcing sleeve. Such a joint may comprise a collar of rubber or the like provided with a pair of vertical internal projections, normally engaging the reinforcing sleeve, and with a pair of horizontal internal projections laterally spaced from that sleeve for intercepting it upon a deflection of the unit from its normal position. The sleeve may carry an elastic cuff bearing from without upon the vehicle body to keep dirt and moisture out of the joint.

BRIEF DESCRIPTION OF THE DRAWING

The above and other features of our invention will now be described in detail with reference to the accompanying drawing in which:

FIG. 1 is a fragmentary plan view (parts broken away) of an impact-damping system according to our invention mounted on the front end of an automotive vehicle;

FIG. 3 is a cross-sectional view taken on the line III—III of FIG. 1;

SPECIFIC DESCRIPTION

Figure 4:
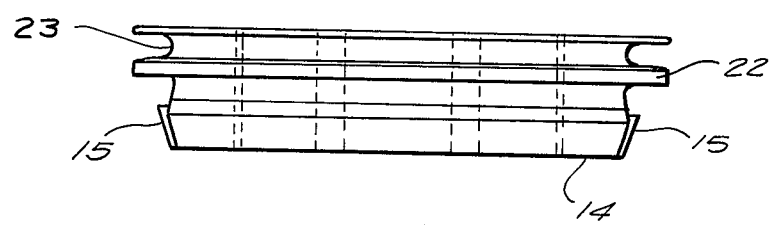
FIG. 4 is a plan view, drawn to a larger scale, of an elastic joint forming part of the system of FIGS. 1 and 2.

The impact-damping system shown in the drawing comprises a largely conventional horizontal bumper bar 5 mounted just ahead of the front end of an automotive vehicle whose body has been partly illustrated by its outline 2. Only the left-hand half of the bumper bar has been illustrated; it will be understood that the other half of the bar and its mounting is symmetrical to the one shown. The vehicular chassis includes a pair of forwardly extending horizontal arms 1 (only the one on the left being visible) which are in the form of hollow struts reinforced by angle profiles; strut 1 is open toward an extremity of bumper bar 5 and accommodates a hydraulic shock absorber, generally designated 4, which includes a cylinder 12 and a piston 13 extending substantially parallel to the longitudinal vehicle axis within a guide tube 3 rigidly secured to the strut 1 by suitable means including a bolt 7. Tube 3 is vertically traversed by a bushing 6, surrounding the bolt 7, which forms a pivot for the rear end of cylinder 12 remote from bumper bar 5.

Piston 13 has a head 13' (see FIG. 6) formed with an orifice 13'' for restricted passage of a hydraulic fluid between two cylinder compartments separated by that head, the latter being normally urged forwardly by a compression spring 28 in the rear compartment. Elements 12, 13 thus form part of a spring-loaded dashpot assembly. The front end of piston 13 is secured by a nut 29 to the closed end 10a of a substantially bell-shaped forwardly diverging base 10 which is bolted at 11 to the bumper bar 5, the bolt heads being encased in a protective rubber strip 20. This strip extends the length of the bar on its exposed front surface and is provided with a pair of guard humps 21 of polyamide near the center of the bar. Base 10 forms part of a stiff, limitedly deformable connection between bar 5 and dashpot cylinder 12, this connection including a sleeve 9 slidably embracing the cylinder so as to be axially movable with reference thereto, jointly with piston 13, in response to frontal stresses acting upon the bar 5.

Figure 5:
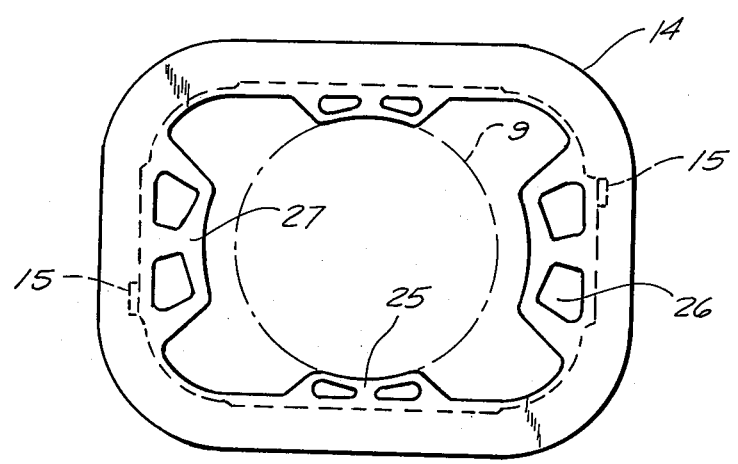
FIG. 5 is a face view of the joint shown in FIG. 4.
Figure 2:
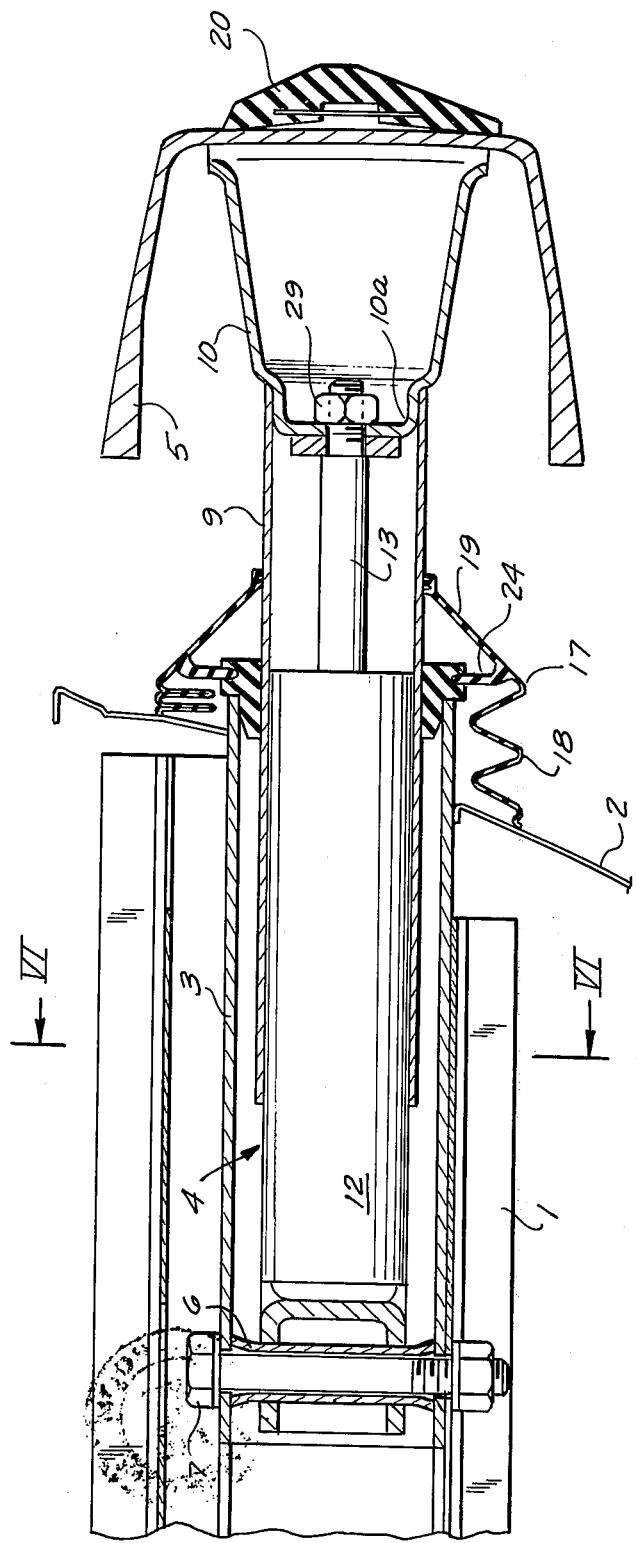
FIG. 2 is a cross-sectional view taken on the line II—II of FIG. 1.
Figure 6:
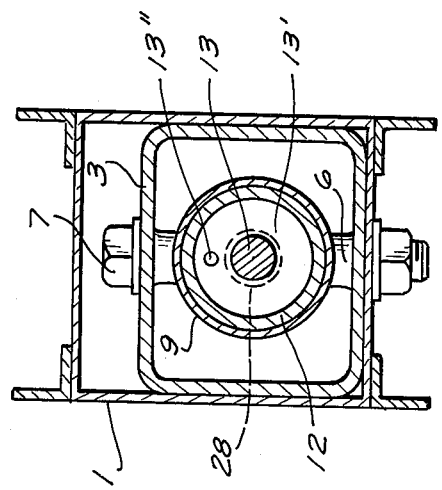
FIG. 6 is a cross-sectional view taken on the line VI—VI of FIG. 2.

A resilient collar 14 embraces the sleeve 9 within the free forward end of guide tube 3 so as to hold the shock absorber 4 centered within that tube. Sleeve 9 is provided with a flexible cuff 17, e.g., of polyamide, which has an accordion-pleated rear portion 18 surrounding the exposed end of tube 3 and an adjoining frustoconical front portion 19 preventing the entry of moisture and dirt into the tube via collar 14. An internal peripheral flange 24 of cuff 17 is snapped into a circumferential groove 23 (see FIG. 4) of collar 14; this collar also has a pair of diametrically opposite locator tongues 15 received in notches 15 of of tube 3 which is of generally rectangular cross-section as seen in FIGS. 5 and 6. As illustrated in FIG. 5, collar 14 is provided midway along the major sides of its cross-section with a pair of internal bosses 25 whose concave confronting surfaces releasably engage the sleeve 9, letting it escape sideways in response to severe lateral stresses. Upon such lateral deflection, sleeve 9 is intercepted by either of two similar internal projections 27 disposed on the shorter vertical sides of the collar. For greater resiliency the projections 25 and 27 are provided with cavities 26. Thus, collar 14 acts as a slide bearing for sleeve 9 which tends to hold that sleeve centered within its guide tube 3 in the absence of lateral stresses.

It will thus be apparent that our improved impact-damping system enables the bumper bar 5 and shock absorbers 4 to swing as a unit about two pivotal axes, represented by the bushings 6, with a certain deformation of the connectors 9, 10 in response to shocks directed at an angle to the longitudinal axis of the vehicle. The two fulcra 7 and the junctions between bases 10 and bumper bar 5 are the corners of a rectangle which is deformed into a parallelogram under such conditions. Substantial kinetic energy is thereby absorbed without damage to the vehicle proper; sleeve 9 protects the piston 13 against canting.

Projections 25, bearing upon the sleeve 9 from above and from below, also absorb the relatively minor vertical stress components which may come into existence in the event of a frontal or lateral collision.

We claim:

1. In an automotive vehicle having a chassis, the combination therewith of an impact-damping system comprising:
    a pair of tubular guide members rigid with said chassis extending substantially parallel to a longitudinal axis of the vehicle at an end of the vehicle body;
    a horizontal bumper bar transverse to said axis spaced from said body at said end thereof;
    a pair of shock absorbers having ends remote from said bumper bar pivotally joined to said guide members, respectively, for swinging in a horizontal plane;
    stiff connecting means of limited deformability joining said shock absorbers to respective extremities of said bumper bar, said connecting means terminating in a pair of bases rigid with said extremities; and
    a pair of slide bearings engaging said shock absorbers for holding same centered within said guide members while allowing said shock absorbers to yield to lateral stresses tending to displace said bumper bar in said horizontal plane.

2. The combination defined in claim 1 wherein each of said shock absorbers includes a cylinder and a piston normally lying substantially parallel to said longitudinal axis.

3. The combination defined in claim 2 wherein said deformable connecting means comprises a pair of sleeves each slidably embracing the cylinder of a respective shock absorber, said cylinder being pivoted to the associated guide member.

4. The combination defined in claim 3 wherein said base is fixedly secured to the piston of the respective shock absorber and diverges outwardly from said piston to said bumper bar.

5. The combination defined in claim 4 wherein said bumper bar has an exposed side provided with an elastic guard strip, said base being secured to said bumper bar by bolts having heads overlain by said guard strip.

6. The combination defined in claim 5 wherein said guard strip is provided with forwardly projecting bosses between the junctions of said bumper bar with said shock absorbers.

7. The combination defined in claim 3 wherein each of said sleeves is provided with a flexible cuff bearing from without upon the vehicle body around said guide member.

8. The combination defined in claim 3 wherein each of said guide members has a free end proximal to said bumper bar provided with an elastic joint releasably holding the cylinder of the associated shock absorber in its normal position.

9. The combination defined in claim 8 wherein said guide members are tubular, said joint comprising a collar surrounding said sleeve and normally keeping same centered in the associated guide member.

10. The combination defined in claim 9 wherein said collar is provided with a pair of vertical internal projections normally engaging said sleeve and with a pair of horizontal internal projections laterally spaced from said sleeve for intercepting same upon deflection thereof from said normal position.

11. In an automotive vehicle having a chassis, the combination therewith of an impact-damping system comprising:
    a pair of guide members rigid with said chassis extending substantially parallel to a longitudinal axis of the vehicle at an end of the vehicle body;
    a horizontal bumper bar transverse to said axis spaced from said body at said end thereof;
    a pair of shock absorbers each including a cylinder and a piston normally lying parallel to said longitudinal axis, the cylinders having ends remote from said bumper bar pivotally joined to said guide members, respectively, for swinging in a horizontal plane; and
    stiff connecting means of limited deformability joining said shock absorbers to respective extremities of said bumper bar, said connecting means yielding to lateral stresses tending to displace said bumper bar in said horizontal plane, said connecting means including a pair of sleeves slidably embracing said cylinders, each sleeve terminating in a base rigid with said bumper bar and fixedly secured to the piston of the respective shock absorber.

12. The combination defined in claim 11 wherein said base diverges outwardly from said piston to said bumper bar.

13. In an automotive vehicle having a chassis, the combination therewith of an impact-damping system comprising:

a pair of guide members rigid with said chassis extending substantially parallel to a longitudinal axis of the vehicle at an end of the vehicle body;

a horizontal bumper bar transverse to said axis spaced from said body at said end thereof;

a pair of shock absorbers each including a cylinder and a piston normally lying parallel to said longitudinal axis, the cylinders having ends remote from said bumper bar pivotally joined to said guide members, respectively, for swinging in a horizontal plane; and stiff connecting means of limited deformability joining said shock absorbers to respective extremities of said bumper bar, said connecting means yielding to lateral stresses tending to displace said bumper bar in said horizontal plane, said connecting means including a pair of sleeves slidably embracing said cylinders, each of said sleeves being provided with a flexible cuff bearing from without upon the vehicle body around the associated guide member.

14. In an automotive vehicle having a chassis, the combination therewith of an impact-damping system comprising:

a pair of tubular guide members rigid with said chassis extending substantially parallel to a longitudinal axis of the vehicle at an end of the vehicle body;

a horizontal bumper bar transverse to said axis spaced from said body at said end thereof;

a pair of shock absorbers each including a cylinder and a piston normally lying parallel to said longitudinal axis, the cylinders having ends remote from said bumper bar pivotally joined to said guide members, respectively, for swinging in a horizontal plane;

stiff connecting means of limited deformability joining said shock absorbers to respective extremities of said bumper bar, said connecting means yielding to lateral stresses tending to displace said bumper bar in said horizontal plane, said connecting means including a pair of sleeves slidably embracing said cylinders; and a collar surrounding each of said sleeves and normally keeping same centered in the associated guide member, said collar being provided with a pair of vertical internal projections normally engaging the associated sleeve and with a pair of horizontal internal projections laterally spaced from the sleeve for intercepting same upon deflection thereof from said normal position.

* * * * *